Nov. 22, 1955  J. W. JACOBS  2,724,576
REFRIGERATING APPARATUS
Filed July 13, 1951  3 Sheets-Sheet 1

INVENTOR.
James W Jacobs
BY
Willits Hardman and Fehr
Attorneys

Nov. 22, 1955   J. W. JACOBS   2,724,576
REFRIGERATING APPARATUS
Filed July 13, 1951   3 Sheets-Sheet 2

INVENTOR.
James W Jacobs
BY
Willits Hardman and Fehr
attorneys

United States Patent Office 2,724,576
Patented Nov. 22, 1955

2,724,576

REFRIGERATING APPARATUS

James W. Jacobs, Dayton, Ohio, assignor to General Motors Corporation, Dayton, Ohio, a corporation of Delaware Application July 13, 1951, Serial No. 236,645

1 Claim. (Cl. 257—3)

This invention relates to refrigerating apparatus and more particularly to a means for maintaining proper refrigerating temperatures under abnormally low environment conditions.

Household refrigerators are normally kept in an occupied room in a residence such as a kitchen. In the United States, it is customary to keep such rooms heated whenever necessary to maintain a minimum daytime temperature of about 68° or 70° F. and a minimum nighttime temperature of about 60° or 65° F. Refrigerators can be designed to maintain proper refrigerating temperatures in both the freezing and food compartments at such temperatures and higher temperatures.

Sometimes household refrigerators are installed on open or closed-in porches where much lower temperatures may be encountered. Under such low temperatures, there is difficulty in causing the refrigerating system to operate often enough to maintain the sufficiently low freezing temperatures in the freezing compartment while preventing the food compartment from reaching freezing or other excessively low temperatures.

It is an object of my invention to provide a simple, inexpensive heating system for the food compartment of a household refrigerator which will cause it to maintain proper refrigerating temperatures under abnormally low environment temperatures as well as it does under normal temperatures.

It is another object of my invention to provide an inexpensive heating system for a household refrigerator which will supply increasing amounts of heat to the food compartment as the environment temperatures fall below a selected temperature.

Briefly, to provide this heat, I employ one or more lamps or heaters arranged in the food compartment under the control of a vibrating thermostat subject to environment or food compartment temperatures. This vibrating thermostat operates to supply an increasing amount of heat to the food compartment as the environment temperature falls below a selected temperature.

Further objects and advantages of the present invention will be apparent from the following description, reference being had to the accompanying drawings, wherein a preferred form of the present invention is clearly shown.

Figure 1:
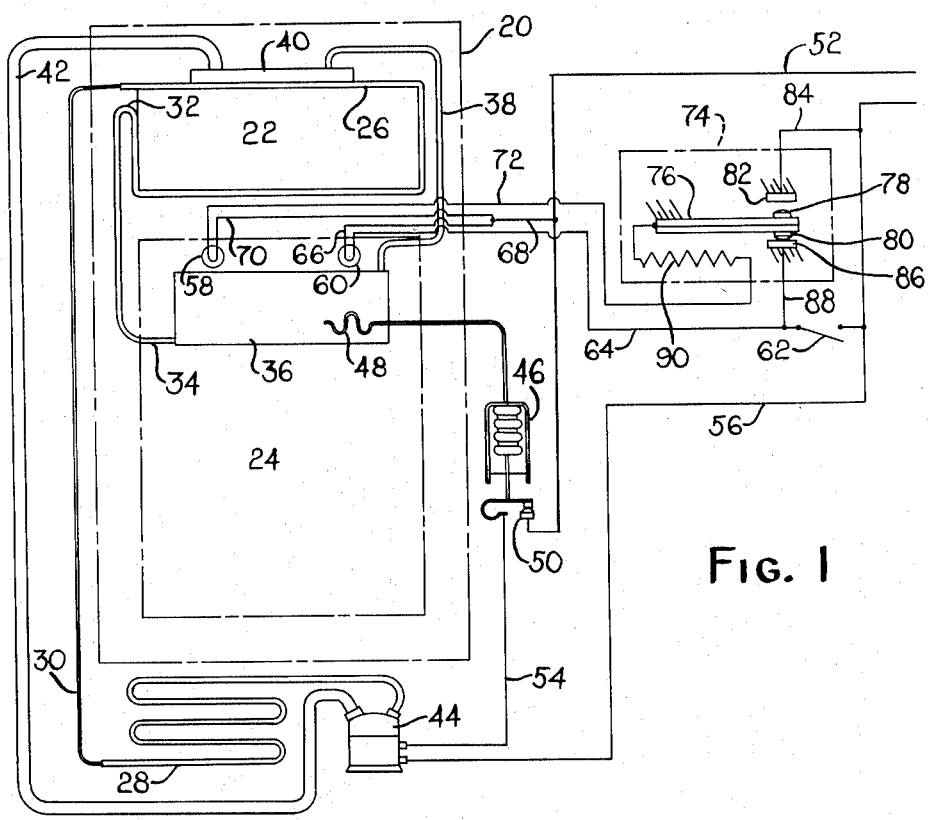
Fig. 1 is a diagrammatic view of a two-compartment type of household refrigerator embodying one form of my invention.

Referring now to the drawings and more particularly to Fig. 1, there is shown diagrammatically a household refrigerator 20 containing an upper freezing compartment 22 and a lower food compartment 24. These compartments 22 and 24 are insulated from each other and from the environment temperature by suitable thermal insulation. The freezing compartment 22 is surrounded by the freezing evaporator coils 26 supplied from the condenser 28 with the liquid refrigerant through the capillary restrictor supply tube 30. A terminal end of the freezing evaporator tubing 26 is provided with a trap 32 connected by the conduit 34 with the bottom of a vertical refrigerated plate 36. The top portion of this plate is connected by the conduit 38 with the top of an accumulator 40 located in heat exchange relation with the freezing compartment 22. The top of the accumulator 40 is connected by the conduit 42 to the inlet of the motor compressor unit 44 which withdraws evaporated refrigerant from the evaporator portions of the system and forwards compressed refrigerant of the condenser 28 where it is liquefied.

The operation of the motor compressor unit 44 is controlled by a constant cut-on type of snap-acting thermostat 46 having its thermal element 48 in heat exchange relation with the lower portion of the refrigerated plate 36. Preferably, this thermostat 46 is adjusted to close at a temperature of about 34° or 36° F. One of the contacts 50 of the thermostat 46 is connected to the supply conductor 52 while the other contact is connected by the conductor 54 to one terminal of the motor compressor unit 44. The second terminal of the motor compressor unit 44 is connected to the supply conductor 56.

The food compartment 24 is provided with two light bulbs 58 and 60 which are lighted when the door of the food compartment is opened and the door-controlled switch 62 is closed as the result of opening the door. One terminal of the switch 62 is connected to the supply conductor while the second terminal has one branch 64 connected to the lamp 60 which in turn is connected by the conductors 66 and 68 to the other supply conductor 52.

Figure 2:
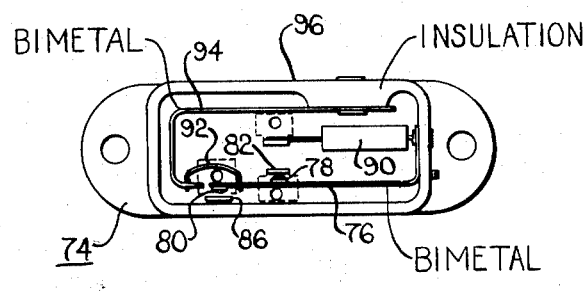
Fig. 2 is a plan view of the vibrating-type thermostat shown diagrammatically in Fig. 1.

The second lamp 58 has one terminal connected by the conductors 70 and 68 to the supply conductor 52 while the secondary conductor 72 is connected to a vibrating-type thermostat generally designated by the reference character 74 and disclosed in detail in Fig. 2. By vibrating temperature responsive means as set forth in the claim, I mean one which vibrates even when the temperature at which it responds does not change. This vibrating-type thermostat 74 includes a bimetal element 76 provided with upper and lower contacts 78 and 80. The upper contact 78 is adapted to engage the stationary contact 82 only when the thermostat 74 is cooled below a selected low temperature, such as 54° F. The stationary contact 82 is connected by the conductor 84 to the supply conductor 56. At temperatures above the selected temperature, such as 54° F., the lower contact 80 is in engagement with the lower stationary contact 86 which is connected by the conductor 88 to the second terminal of the door operated switch 62. At temperatures below the selected low temperature such as 54° F., the bimetal 76 is caused to slowly vibrate by the heater 90 which has one terminal connected to the anchored end of the bimetal 76 and the other terminal connected by the conductor 72 to the lamp 58. As a result of this arrangement, when temperatures are above the selected temperature, such as 54° F., the cantilever bimetal 76 will be held with its lower contact 80 in contact with the lower stationary contact 86. Whenever the door is opened to close the door switch 62, the two lamps 58 and 60 will be connected in parallel circuit with each other across the supply conductors 52 and 56. Whenever the temperature falls to 54° F. or below, the vibrating thermostat 74 will begin to slowly vibrate with the bimetal element 76 first moving the contact 78 into engagement with the stationary contact 82. The heater 90 will then be energized and will heat the bimetal 76 sufficiently to cause it to move back to its lower position. The bimetal will then cool and return to its upper position with the contacts 78 and 82 in engagement, thereby re-energizing the heater and causing continuous cycling as long as the temperature is at 54° F. or below.

One form of practical embodiment of a vibrating thermostat is shown in its cold position in Fig. 2. The free end of the contact carrying bimetal element 76 is pivotally connected to a C-shaped snap-acting toggle spring 92 which in turn is pivotally connected to a hook-shaped bimetal element 94 which is anchored to the wall portion of the housing 96 of the vibrating thermostat which is made of some suitable insulating material. The heater 90 connects directly to the anchored end of the bimetal element 76. The bimetal element 76 carries the upper and lower contacts 78 and 80 which make engagement with the upper and lower stationary contacts 82 and 86. The bimetal elements 76 and 94 are impelled in opposite directions by temperature changes to move the toggle spring 92 back and forth across its dead center position to cause alternate engagement of the contacts 78 and 82 and 80 and 86.

Figure 3:
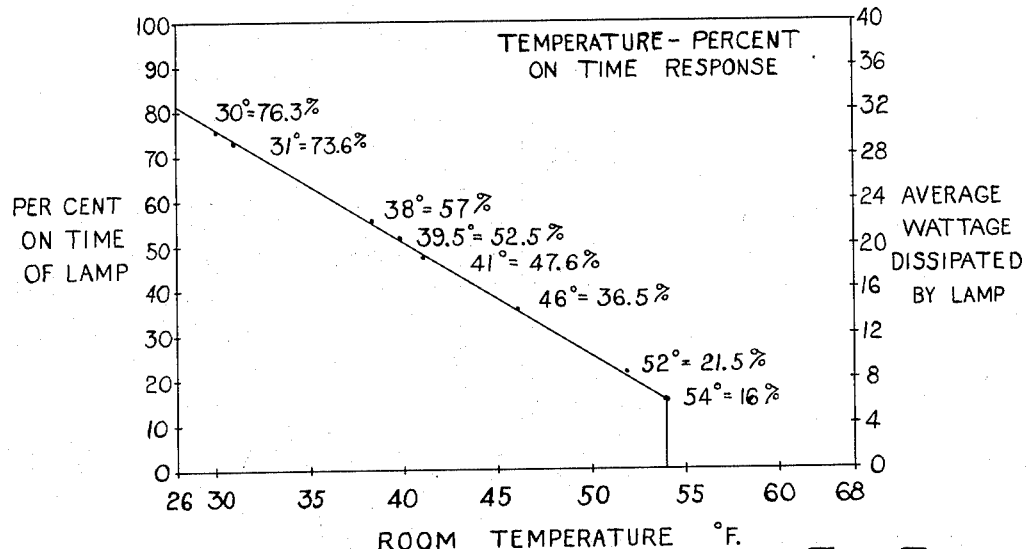
Fig. 3 is a chart showing the percent on-time of the lamp and the average wattage dissipated by the lamp plotted against various room temperatures.

This type of thermostat is constructed so that it is closed only 16% of the time at 54° F. but is closed at increasing percentage of the time as the environment temperature falls below 54° F., as shown by the chart in Fig. 3. The lamp 58 has a wattage rating selected to provide just the correct amount of heat to the food compartment 24 to maintain the temperature within the food compartment 24 at a suitable value such as 37° F. This temperature insures sufficient operation of the refrigerating system to maintain temperatures in the freezing compartment below about 8° F. The thermostat 46 is preferably set to close at about 34° to 36° F. and to open at about 0° F. or below. By this particular arrangement, suitable refrigerating temperatures are kept even though the refrigerator should be located in either an open or closed-in porch in winter weather.

Figure 4:
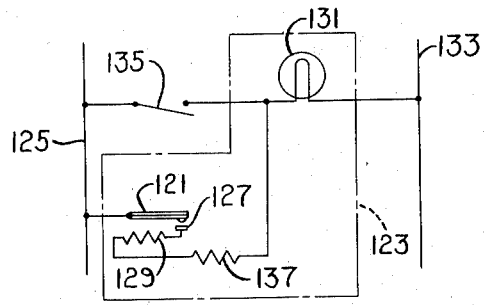
Fig. 4 is a diagrammatic view showing a modified form of heating arrangement.

In Fig. 4, there is shown a modified form in which the slowly vibrating bimetal thermostat 121 is placed within the food compartment 123. The anchor terminal of the bimetal thermostat 121 is connected directly to the supply conductor 125. The free end of the bimetal thermostat 121 is provided with a contact which at temperatures of 34° to 36° F. or below makes momentary contact with the stationary contact 127. The stationary contact 127 is connected to the electric heater 129 placed in heat exchange relation with the bimetal 121 so as to cause the bimetal 121 to slowly vibrate in the same manner as the slowly vibrating thermostat 74. The heater 129 is connected to one terminal of a lamp 131, also located within the food compartment 123. The other terminal of the lamp is connected directly to the second supply conductor 133. The lamp 131 is energized whenever the contact 127 is engaged or whenever the door-controlled switch 135 is closed by the opening of the door to the food compartment 123. Since only one lamp is used to light the food compartment, then it may be necessary to provide a lamp of higher wattage than either of the lamps 58 or 60 in Fig. 1 to provide satisfactory illumination. Therefore, to cut down the heating rate when the wattage of the lamp 131 is too high, I provide an optional additional resistance 137 between the heater 129 and the adjacent terminal of the lamp 131. This resistance 137 may, of course, be omitted when the lamp 131 has a lower wattage rating. In all other respects, the refrigerator and the system may be the same as that shown in Figs. 1 and 2.

Figure 5:
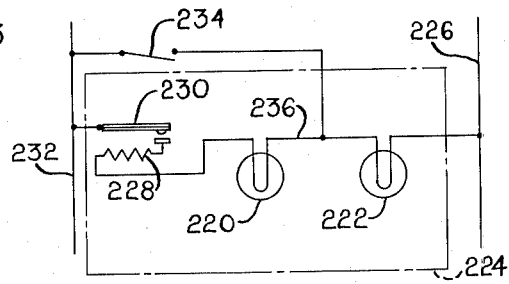
Fig. 5 is a wiring diagram showing a second modified heating arrangement.

In Fig. 5, there is shown a modification in which there are two lamps 220 and 222 provided in the food compartment 224. The two lamps 220 and 222 are connected in series to the supply conductor 226. The other terminal of the lamp 220 is connected to the heater element 228 of the slowly vibrating-type thermostat 230 having its other terminal connected directly to the supply conductor 232. In this arrangement, when the vibrating-type thermostat 230 is closed, the two lamps 220 and 222 are connected in series across the supply conductors 232 and 226. The door-controlled switch 234 is connected between the supply conductor 232 and the conductor 236 which joins the adjacent terminals of the lamps 220 and 222. The closing of the door-controlled switch 234 by the opening of the food compartment door will energize only the lamp 222, while the vibrating thermostat 230 will control the energization of the lamp 220. Such a vibrating type thermostat 230 should be set to close essentially at about 34° to 36° F. and rapidly provide increasing percentages of closed time as the temperature approaches 32° F. In all other respects, the refrigerator will be like that shown in Figs. 1 and 2.

Figure 6:
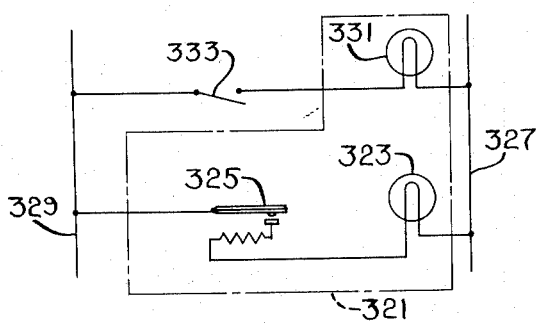
Fig. 6 is a wiring diagram showing a third modified heating arrangement.

In Fig. 6, the food compartment 321 has one lamp 323 and the vibrating thermostat 325 connected across the supply conductors 327 and 329. The vibrating thermostat 325 is set so that it is closing a small percentage of the time at about 36° F. and is closed increasing percentages of time as the temperature approaches 32° F. The food compartment 321 is provided with a second lamp 331 controlled by the door-operated switch 333 which is closed whenever the food compartment door is opened to light the lamp 331. In all other respects, this refrigerator will be like that shown in Figs. 1 and 2.

Figure 7:
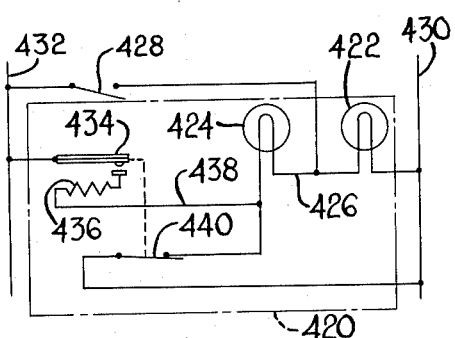
Fig. 7 is a wiring diagram showing a fourth modified heating arrangement.

In Fig. 7, the food compartment 420 is provided with the lamps 422 and 424. The conductor 426 connecting the adjacent terminals of the lamps 422 and 424 is connected to the door-operated switch 428 which is closed when the food compartment door is opened. The second terminal of the lamp 422 is connected to the supply conductor 430 while the second terminal of the door-controlled switch 428 is connected to the supply conductor 432. Within the food compartment 420, there is provided a slowly vibrating-type double throw thermostat 434. This vibrating-type thermostat 434 has one terminal connected to the supply conductor 432. It is provided with an electric heater 436 to secure the slow vibrating action which is connected by the conductor 438 to the lamp 424. Whenever the contacts at the end of the slowly vibrating thermostat close, there is established through the thermostat 434, the heater 436, the conductor 438, the lamp 424, the conductor 426, and the lamp 422 so that heat is supplied to the interior of the food compartment 420. This type of vibrating thermostat 434 should be set to close at about 36° F. and should close in increasing percentages of time as the food compartment temperature approaches 32° F.

The vibrating thermostat 434 also operates a second contact 440 which closes when the vibrating thermostat 434 has its other contact in the open position. This is the situation as long as the temperature within the food compartment 420 is above the selected temperature at which the vibrating thermostat 434 is set to close initially.

Whenever the switch 440 is in the closed position, the closing of the door-controlled switch 428 will cause both lamps 422 and 424 to be connected in parallel across the supply conductors 430 and 432 so that they will be energized at full wattage to provide adequate illumination. However, the maximum wattage obtainable under the control of the vibrating thermostat 434 will be ¼ the maximum obtainable in the parallel circuit arrangement because of the series connection of the lamps 424 and 422 with the vibrating thermostat 424.

Figure 8:
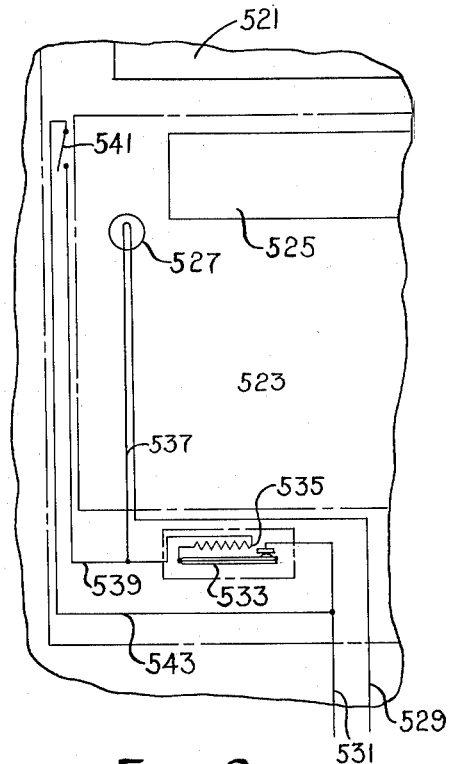
Fig. 8 is a fragmentary diagrammatic view of a household refrigerator showing in the form of a wiring diagram, another heating system for the food compartment.

In Fig. 8, there is shown a refrigerator including a freezing compartment 521 and a food compartment 523 provided with a refrigerated plate 525. This refrigerator is adapted to have a refrigerating system like that shown in Fig. 1. The food compartment 523 is provided with a lamp 527 having one terminal connected to the supply conductor 529. The second supply conductor 531 has one branch connected to the stationary contact of a vibrating thermostat 533 which has its anchored end connected to the electric heater 535 providing the slow vibrating action of the thermostat. As indicated by the dot-dash outlines in Figure 8, the thermostat 533 is located outside the food compartment 523 in the machine compartment beneath in which are customarily located the motor-compressor and condenser units 44 and 28. The heater 535 has one branch 537 connected to the second terminal of the lamp 527 and has a second branch 539 connected to one terminal of the door-controlled switch 541 which is closed whenever the door of the food compartment 523 is opened. The second terminal of the switch 541 is connected by the conductor 543 to the supply conductor 531. By this arrangement, whenever the door-controlled switch 541 is closed, the lamp 527 will be lighted to provide illumination for the food compartment. The vibrating-type thermostat 533 is preferably constructed like the vibrating-type thermostat shown in Fig. 2, except that the stationary contact 86 is omitted. It may be set to begin its closing and its slow vibrating action at some selected low temperature, such as 54° F.

Figure 9:
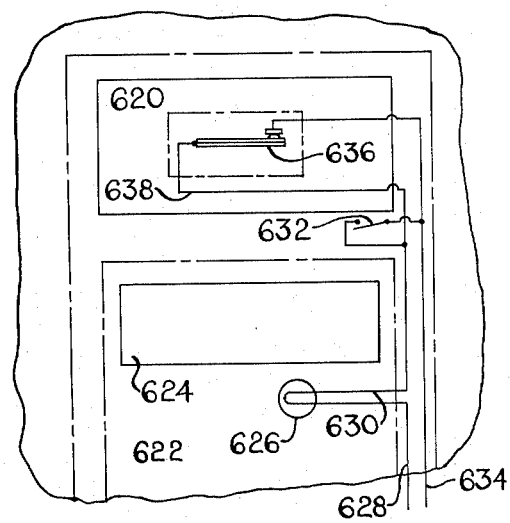
Fig. 9 is a fragmentary diagrammatic view of a household refrigerator with the wiring diagram of another form of heating arrangement.

In Fig. 9, there is shown a refrigerator having a freezing compartment 620 and a food compartment 622. The food compartment is cooled by a refrigerated plate 624. The food compartment is also provided with a lamp 626 having one terminal connected to the supply conductor 628. The second terminal of the lamp 626 is connected to a conductor 630 having one branch connected to the switch 632 which is closed whenever the door to the food compartment 622 is open. The second terminal of this door-controlled switch 632 is connected to the supply conductor 634. Thus, whenever the door of the food compartment 622 is opened, the switch 632 is closed to light the lamp 626 for illumination.

Should the environment temperature become so low that the refrigeration system operates so little of the time that insufficient cooling is provided for the freezing compartment 620, there is provided an arrangement for lighting the lamp 626 whenever the freezing compartment 620 rises to an abnormally high temperature such as 12° to 15° F. To do this automatically, there is provided a simple bimetal thermostat 636 having its terminals connected to the conductors 638 and 634 so that whenever it is closed, the lamp 626 will be lighted. This simple bimetal thermostat 636 may be set to close at 15° F. Therefore, whenever the temperature in the freezing compartment rises to 15° F., the lamp 626 will be lighted so as to hasten and increase the operation of the motor compressor unit. This simple arrangement will also protect the food compartment 622 from freezing providing the environment temperature does not fall to temperatures near to 15° F. However, to protect for all temperatures an additional lamp, such as the lamp 527 in Figure 8, and a vibrating type thermostat, such as the thermostat 533 and its heaters 535 in Figure 8, must also be provided. In all other respects, the system is like that shown in Fig. 1.

Figure 10:
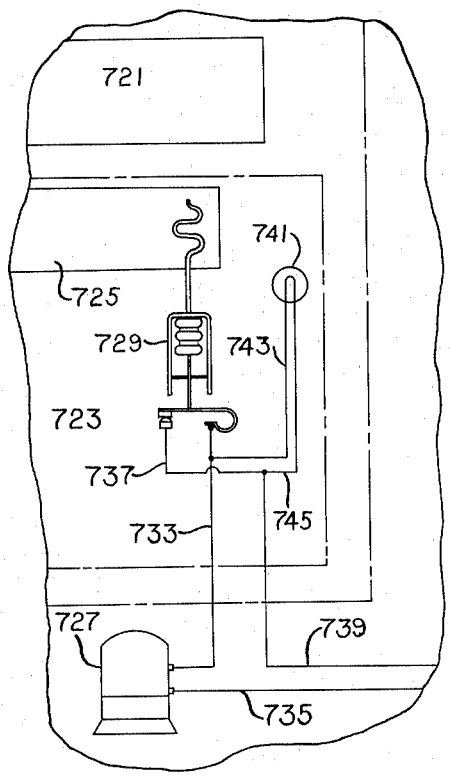
Fig. 10 is a fragmentary view of a household refrigerator provided with a wiring diagram of another heating arrangement.

In Fig. 10, there is shown a refrigerator with a freezing compartment 721 and a food compartment 723 provided with a refrigerated plate 725. This refrigerator is provided with a refrigerating system similar to that shown in Fig. 1 and has a sealed motor compressor unit 727 connected to the system like the motor compressor unit 44. The operation of the refrigerating system is controlled by a snap-acting thermostat switch 729 having one terminal connected by the conductor 733 to the motor compressor unit 727. The second terminal of the motor compressor unit 727 is connected to the supply conductor 735. The second terminal of the thermostat 729 is connected by the conductors 737 to the supply conductor 739.

In this form, there is no special thermostat provided for controlling the supply of heat for the food compartment 723. Instead of this, there is provided a heating means conveniently in the form of an electric lamp 741 in the food compartment 723 with one terminal connected by the conductors 743 to the conductor 733 and the second terminal connected by the conductor 745 to the supply conductor 739. It is intended in this installation that the light bulb will not be inserted in the food compartment except when the environment temperatures are expected to fall below about 40° or 45° F. The lamp 741 is shunted around the contacts of the thermostat switch 729 so that it will only be lighted when the thermostat contacts are in the open position. Therefore, during the warmer portions of the day when the refrigerating system is on a greater percentage of time, the light bulb 741 will be lighted a lesser proportion of the time. When the environment temperature is low, the refrigerating system will operate for only short periods of time at widely separated intervals and the light bulb 741 will then be energized nearly all the time. Higher wattage light bulbs may be used if very cold temperatures are expected. This will supply sufficient heat to the food compartment so that sufficiently low temperatures are maintained in the freezing compartment 721 and sufficiently high temperatures are maintained in the food compartment 723. This illustrates the manner in which the thermostat 729 will provide increasing amounts of heat for the food compartment 723, as the length and frequency of the operating periods of the refrigerating system diminish because of lower environment temperatures.

While the form of embodiment of the invention as herein disclosed constitutes a preferred form, it is to be understood that other forms might be adopted, as may come within the scope of the claim which follows:

What is claimed is as follows:

A household refrigerator comprising: a cabinet having separated unfrozen and frozen food compartments; a refrigerating system for said compartments including a compressor, condenser, an unfrozen food evaporator and a frozen food evaporator the outlet of said condenser being connected to the inlet of said frozen food evaporator and the outlet of said frozen food evaporator being connected to the inlet of said unfrozen food evaporator whereby the refrigerant flows serially through the frozen food evaporator and the unfrozen food evaporator to the inlet of the compressor; a first thermostat responsive to temperatures of said unfrozen food evaporator and cycling said compressor to maintain said unfrozen food compartment below a selected refrigerating temperature; a heater in said unfrozen food compartment; a second thermostat independent of said first thermostat and responsive to temperature outside said food compartments for energizing said heater while said outside temperature is between substantially 54° F. and 26° F.; and heating means sufficiently energized in response to the energization of said heater and associated with said second thermostat to cause said second thermostat to cycle continuously between heater energizing and heater deenergizing positions while said outside temperature is between substantially 54° F. and 26° F. and to cause the duration of heater energizing cycles to increase as said outside temperature decreases.

References Cited in the file of this patent

UNITED STATES PATENTS

| | | | |
|---|---|---|---|
| 1,439,051 | Anderson | Dec. 19, | 1922 |
| 1,883,243 | Bogle | Oct. 18, | 1932 |
| 2,060,774 | Zurcher | Nov. 10, | 1936 |
| 2,152,486 | Knight | Mar. 28, | 1939 |
| 2,246,956 | Shaw | June 24, | 1941 |
| 2,253,162 | Ayers | Aug. 19, | 1941 |
| 2,325,511 | Heintzen | July 27, | 1943 |
| 2,488,161 | Benson et al. | Nov. 15, | 1949 |
| 2,489,049 | Root | Nov. 22, | 1949 |
| 2,498,864 | Root | Feb. 28, | 1950 |
| 2,548,983 | Klug | Apr. 17, | 1951 |
| 2,594,023 | Kubacker | Apr. 22, | 1952 |
| 2,627,393 | Shell | Feb. 3, | 1953 |